(12) United States Patent
Colotte et al.

(10) Patent No.: US 9,027,355 B2
(45) Date of Patent: May 12, 2015

(54) MECHANICAL DRIVE DEVICE FOR DRIVING THE HIGH PRESSURE SUB ASSEMBLY OF AN AIRPLANE ENGINE

(75) Inventors: Baptiste Benoît Colotte, Melun (FR); Jean Pierre Elie Galivel, Savigny le Temple (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 1184 days.

(21) Appl. No.: 12/913,409

(22) Filed: Oct. 27, 2010

(65) Prior Publication Data

US 2011/0150567 A1    Jun. 23, 2011

(30) Foreign Application Priority Data

Oct. 29, 2009   (FR) ...................................... 09 57615

(51) Int. Cl.
*F02C 7/32* (2006.01)
*F01D 25/36* (2006.01)
*H02K 7/18* (2006.01)

(52) U.S. Cl.
CPC ............. *F02C 7/32* (2013.01); *Y10T 403/7039* (2015.01); *F01D 25/36* (2013.01); *H02K 7/1823* (2013.01); *H02K 7/1861* (2013.01); *Y02T 50/671* (2013.01); *F05D 2220/764* (2013.01); *F05D 2260/4031* (2013.01)

(58) Field of Classification Search
CPC ..... F01D 25/36; F02C 7/32; F05D 2220/764; F05D 2260/4031; H02K 7/1823
USPC ............... 60/802, 788, 786, 39.091, 778, 779
See application file for complete search history.

(56) References Cited

U.S. PATENT DOCUMENTS

| | | | | |
|---|---|---|---|---|
| 4,733,155 A * | 3/1988 | Smith | ............................. | 322/10 |
| 4,733,529 A * | 3/1988 | Nelson et al. | .............. | 60/39.091 |
| 5,813,829 A * | 9/1998 | Mazzotta | ....................... | 415/123 |
| 2006/0099095 A1 * | 5/2006 | Brouillet et al. | ......... | 417/423.14 |
| 2006/0248900 A1 * | 11/2006 | Suciu et al. | ..................... | 60/802 |
| 2006/0260323 A1 | 11/2006 | Moulebhar | | |
| 2008/0006023 A1 * | 1/2008 | Lardellier | .................... | 60/226.1 |
| 2010/0242496 A1 * | 9/2010 | Cass et al. | ....................... | 60/802 |
| 2012/0026491 A1 * | 2/2012 | Short et al. | ................. | 356/241.1 |

FOREIGN PATENT DOCUMENTS

EP   1 338 773 A2   8/2003
EP   1 876 337 A1   1/2008

OTHER PUBLICATIONS

Merriam-Webster Dictionary OnLine, Apr. 2010, http://web.archive.org/web/20100410153555/http://www.merriam-webster.com/dictionary/axis.*
French Preliminary Search Report issued May 28, 2010, in French 0957615, filed Oct. 29, 2009 (with English Translation of Category of Cited Documents).

* cited by examiner

*Primary Examiner* — Phutthiwat Wongwian
*Assistant Examiner* — Marc J Amar
(74) *Attorney, Agent, or Firm* — Oblon, McClelland, Maier & Neustadt, L.L.P.

(57) ABSTRACT

A manual mechanical drive to a high pressure sub assembly of a turbojet during endoscopic inspection of the high pressure turbine is provided. A coupling element suitable for coupling with an external actuator such as a crank handle is fitted on the axis of an alternator that is normally driven mechanically via the high pressure sub assembly, thereby providing a coupling suitable for driving said high pressure sub assembly.

9 Claims, 2 Drawing Sheets

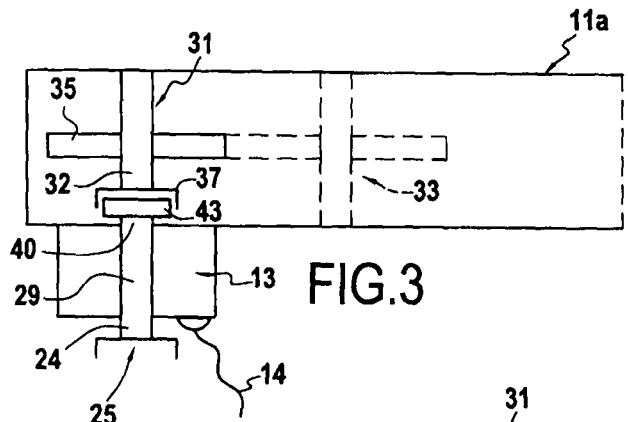
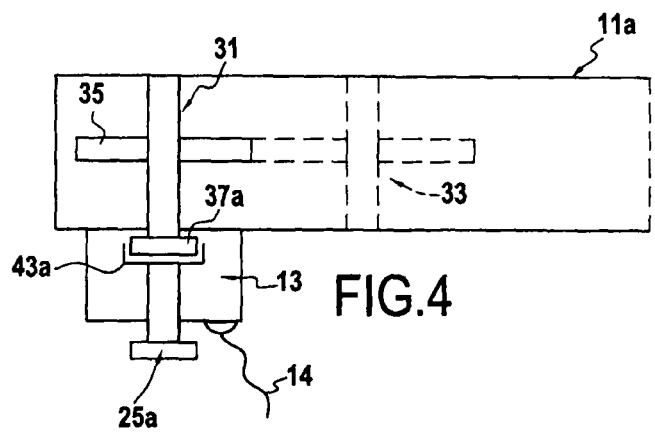
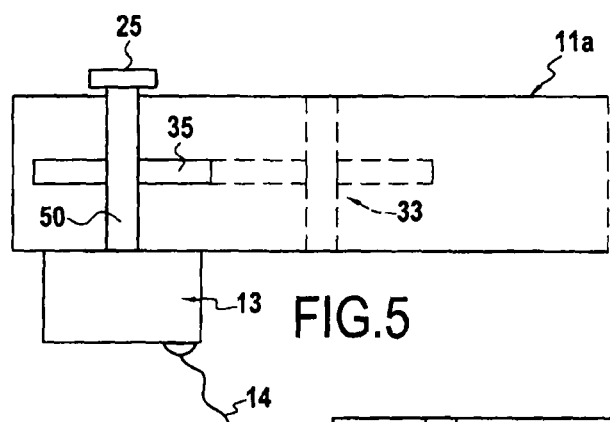
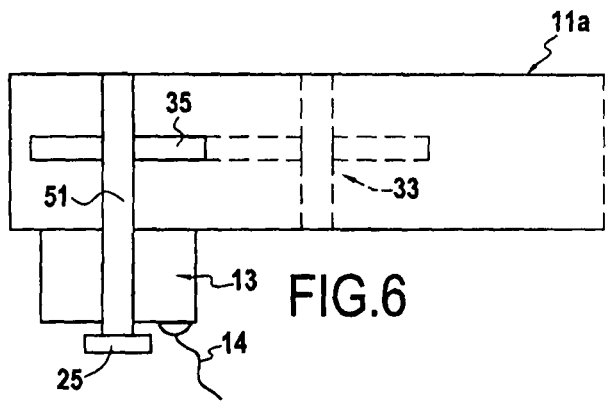

MECHANICAL DRIVE DEVICE FOR DRIVING THE HIGH PRESSURE SUB ASSEMBLY OF AN AIRPLANE ENGINE

FIELD OF THE INVENTION

The invention relates to a mechanical drive device, e.g. operable by means of a crank handle, for turning the rotating part of the high pressure sub assembly of an airplane engine while inspecting said sub assembly rotating part, e.g. for the purpose of detecting defects such as cracks on the blades of a rotor of said high pressure sub assembly, in particular the rotor of the high pressure compressor. The type of inspection that is more particularly concerned is conventional endoscopic inspection, which requires the high pressure sub assembly rotating part to be turned slowly in order to inspect its blades one by one.

The invention relates more particularly to an improvement taking better advantage of the equipment that is associated with the gearbox that is coupled to the shaft of such a high pressure sub assembly for the purpose of driving accessories.

BACKGROUND OF THE INVENTION

In an airplane turbojet, the high pressure sub assembly includes the high pressure compressor that provides air under pressure to the combustion chamber, and the high pressure turbine that turns a shaft that is itself coupled to the high pressure compressor in order to drive it. During maintenance operations, it is necessary to inspect the state of the rotary portions, in particular the rotor blades, with inspection initially being visual. This is commonly done endoscopically. The end of an endoscope is inserted into the casing of the high pressure sub assembly and the rotor is turned slowly in order to be able to identify visible defects.

For this purpose, it is conventional to have a crank handle that is engaged on a dedicated mechanical drive coupling of the engine gearbox. The engine gearbox is mechanically coupled to the shaft of the high pressure sub assembly, since the gearbox is normally driven by it. Since this drive coupling needs to enable the high pressure sub assembly to be turned slowly and by hand, a shaft line presenting a considerable stepdown ratio is needed in order to ensure that the amount of torque required is compatible with the force that can reasonably be expected of an operator. Proposals have also been made for motor-driven equipment to be connected to said drive coupling instead of a handle. In any event, other things being equal, the volume and the weight of the gearbox are increased by having stepdown gearing with the sole function of making endoscopic inspection possible, i.e. making it possible to turn the high pressure sub assembly slowly.

Simplifying the gearbox by omitting that stepdown gearing would enable the suspended mass that needs to be held in the event of high loading (blade loss) to be reduced. That would enable the weight of the suspension for the gearbox to be reduced, the maximum cross-section of the nacelle to be reduced, and consequently the specific consumption of the engine to be reduced. Constraints on covering the engine in the zone in question would also be reduced.

OBJECT AND SUMMARY OF THE INVENTION

An object of the invention is thus to simplify the gearbox by providing an access point for the equipment that serves to turn the high pressure sub assembly slowly during inspection operations, in particular endoscopic inspection operations.

The invention results from the observation that the gearbox also serves as a support for a specific alternator, in principle dedicated exclusively to electrically powering a computer associated with the engine (known in particular as a full authority digital engine control or FADEC). This alternator is driven by the high pressure sub assembly via another shaft line of the gearbox that presents a stepdown ratio of the same order of magnitude as that for the mechanical drive coupling that is dedicated to low-speed drive.

The invention thus consists in combining those two shaft lines, and more particularly in conserving only the line for the alternator, by making it possible to drive the high pressure sub assembly via the rotor of the alternator and/or the shaft that drives it.

More particularly, the invention thus provides a mechanical drive device for driving the high pressure sub assembly of an airplane engine in order to inspect a rotary portion thereof, said high pressure sub assembly being mechanically coupled via a gearbox to a specific alternator, wherein at least one coupling element for coupling with an external actuator is accessible on the axis of said alternator, and is usable as a coupling for coupling drive to said high pressure sub assembly.

The term "axis" of the alternator, is used to cover equally well the shaft of its own rotor and the same-axis shaft of the gearbox that drives it. Said external actuator may be a crank handle or a motor-driven system. A shaft line is constituted by one or more gearwheels on a given shaft, the gearwheels co-operating with gearwheels on neighboring shaft lines.

In an embodiment, a first end of the rotor shaft of the alternator projects outside the casing of the alternator, and this end is provided with such a coupling element. This embodiment thus requires minimal modification to the alternator and makes the above-mentioned simplification of the gearbox possible.

In another embodiment, one end of a drive shaft for driving the alternator and forming part of the gearbox is provided with such a coupling element.

During maintenance operations, it may be necessary to remove the alternator. Provision can therefore be made for such a coupling element to become accessible when the alternator is removed. More particularly, a second end of the rotor shaft of the alternator is then provided with a complementary coupling element that is normally engaged with said coupling element situated at the end of the alternator drive shaft (forming part of the gearbox), such that removing the alternator makes the coupling element of the drive shaft accessible in order to couple said external alternator thereto.

In yet another possibility, said alternator and said gearbox have a shaft in common with one end thereof projecting outside the gearbox or said alternator and provided with said coupling element.

BRIEF DESCRIPTION OF THE DRAWINGS

The invention can be better understood and other advantages thereof appear more clearly in the light of the following description of various embodiments of a drive device in accordance with the principle of the invention, given purely as examples and made with reference to the accompanying drawings, in which:

FIG. 3 is a diagrammatic view showing a first embodiment of the drive device;

FIG. 4 is a diagrammatic view showing a second embodiment of the drive device;

FIG. 5 is a diagrammatic view showing a third embodiment of the drive device; and FIG. 6 is a diagrammatic view showing a fourth embodiment of the drive device.

MORE DETAILED DESCRIPTION

Figure 1:
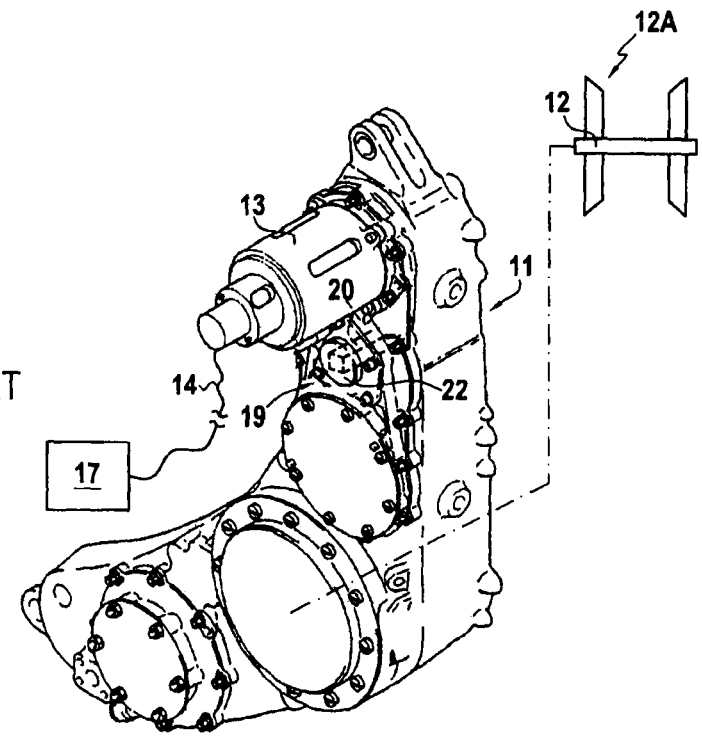
FIG. 1 shows a prior art gearbox associated with an airplane turbojet.

FIG. 1 shows a conventional gearbox 11 that is mechanically coupled by shafts and bevel gears to the shaft 12 of the high pressure sub assembly 12A of an airplane turbojet. The gearbox serves to take off power from the high pressure sub assembly shaft for powering various pieces of equipment and accessories that are needed to ensure proper operation of the engine and the airplane. In particular, it is conventional to install on the gearbox a specific alternator 13 (a permanent magnet alternator known under the abbreviation PMA) serving solely to provide electrical power for a computer 17. The power supply takes place via a bundle of electric wires 14 making an electrical connection between the alternator and the computer.

Furthermore, essentially for the requirements of endoscopic maintenance inspections, the gearbox includes a mechanical motion takeoff 19 with an end having a square (or hexagonal) section 20 to which it is possible to fit a crank handle so as to cause the high pressure sub assembly 12A to turn slowly while performing endoscopic inspection of a rotary portion thereof. In FIG. 1, the element for receiving the handle is protected by a cover 22 that is screwed on and that blocks access thereto other than during a maintenance operation.

Inside the gearbox, a specific shaft line with stepdown gearing is thus installed to limit the torque that the operator needs to supply in order to cause the high pressure sub assembly to turn slowly in a manner suitable for endoscopic inspection. These elements are therefore of no use in flight. In contrast, they make the gearbox heavier and bulkier. It would therefore be desirable to be able to omit them.

Figure 2:
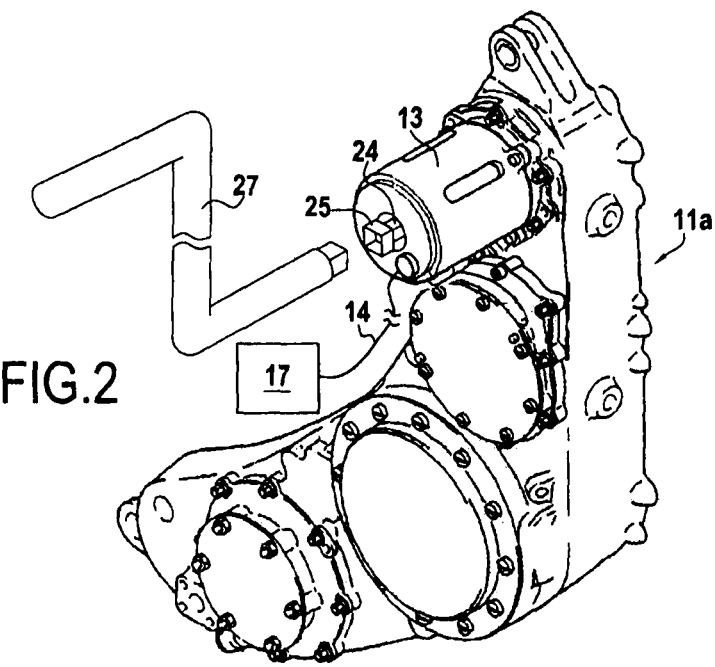
FIG. 2 shows a possible simplification of the gearbox in accordance with the invention.

According to the invention and as shown in FIG. 2, this result is achieved by making provision for at least one coupling element 25 for coupling to an external actuator 27 (e.g. a handle) to be provided on the axis of the alternator 13. In the example of FIG. 2, it can be seen that a first end 24 of the rotor shaft of the alternator 13 projects outside its casing and that this end is provided with a coupling element 25, here in the form of a hollow segment of square section. Naturally, a protective cover could be mounted outside the alternator to close off mechanical access other than during a maintenance operation, i.e. when the airplane is in normal service. The cover is not shown in FIG. 2. The coupling element given reference 25 is accessible from the outside without any need to remove the alternator 13.

In the diagram of FIG. 3, there can be seen the rotor shaft 29 of the alternator 13 and the last shaft line 31 that is associated therewith, lying on the same axis as the rotor shaft and arranged inside the gearbox 11a. This shaft line 31 thus includes a shaft 32 that drives the rotor shaft 29 directly. The shaft 32 carries a gearwheel 35, itself meshing with a stepdown mechanism 33 represented symbolically by dashed lines. Furthermore, outside the alternator 13, there can be seen a coupling element 25 at said first end 24 of the rotor shaft 29 of the alternator 13. In this variant, one end of the drive shaft 32 of the alternator (inside the gearbox), and forming part of the gearbox, is provided with another coupling element 37, while a second end 40 of the rotor shaft of said alternator is provided with a complementary coupling element 43 that is normally engaged with the coupling element 37 of the drive shaft 32 when the alternator 13 is mounted on the gearbox 11a. Under such conditions, even if the alternator is removed, for any reason whatsoever during maintenance operations, it is still possible to perform endoscopic inspection because removal of the alternator 13 makes the coupling element 37 of the drive shaft 32 accessible for coupling the external actuator thereto, i.e. a handle, for example. In a variant, it is even possible to omit the coupling element 25 at the first end 24 of the rotor shaft, although that would make it necessary to remove the alternator on each occasion that it is necessary to perform endoscopic inspection.

In the example shown in FIG. 3, the coupling elements 25 and 37 are of the socket type (of square or hexagonal section), while said complementary coupling element 43 is of the plug type, however it is clear that the arrangement could be inverted, as shown in FIG. 4.

In the example of FIG. 3, the coupling 37 of the drive shaft 32 is situated inside the gearbox 11a, while the complementary coupling element 43 secured to the shaft 29 of the alternator 13 projects from the back of the alternator housing so that, when the alternator is mounted on the gearbox 11a, the two coupling elements 37 and 43 engage with the coupling elements being situated inside the gearbox 11a. The arrangement shown in the embodiment of FIG. 4 is inverted in that the coupling element 37a of the gearbox projects outside the gearbox, while the complementary coupling element 43a is situated inside the casing of the alternator 13. Under such conditions, when the alternator 13 is mounted on the gearbox the two coupling elements 37a and 43a engage at a location that is inside the alternator. Removing the alternator gives access to the coupling element 37a that is then located outside the gearbox 11a. In this example of FIG. 4, the coupling element 25a at said first end is preferably of the plug type, i.e. of the same type as the coupling element 37a.

In FIG. 5, the alternator 13 and the gearbox 11a share a common shaft 50 having one end projecting outside the gearbox, on its side opposite from the alternator, and it is provided with the coupling element 25.

In the variant of FIG. 6, the alternator 13 and the gearbox 11a likewise share a common shaft 51, which shaft has an end projecting outside the alternator, and it is this end that is provided with the coupling element 25.

What is claimed is:

1. A mechanical drive device for driving a high pressure sub assembly of an airplane engine in order to inspect a rotary portion thereof, said high pressure sub assembly being mechanically coupled via a gearbox to an alternator, wherein a first coupling element for coupling with an external actuator is accessible on and provided on a rotor shaft of said alternator aligned with an axis of said alternator, and is usable as a coupling to enable driving of said high pressure sub assembly, wherein said first coupling element is disposed on a first end of said rotor shaft, and wherein a second end of the rotor shaft of said alternator includes a second coupling element which is coupled to a third coupling element provided at a first end of a drive shaft of said gearbox aligned with said axis such that said first coupling element, said rotor shaft of said alternator, and said drive shaft of said gearbox are rotatable together.

2. A mechanical drive device according to claim 1, wherein the first end of the rotor shaft of said alternator projects outside of a casing of the alternator, and the first coupling element is disposed outside of the casing of said alternator.

3. A mechanical drive device according to claim 1, wherein when said alternator is removed from said gearbox, said third coupling element of said drive shaft is accessible to enable said external actuator to be coupled thereto.

4. A mechanical drive device according to claim 3, wherein said second coupling element and said third coupling element are situated inside said gearbox.

5. A mechanical drive device according to claim 3, wherein said second coupling element and said third coupling element are situated inside a casing of said alternator.

6. A mechanical drive device for driving a high pressure sub assembly of an airplane engine in order to inspect a rotary portion thereof, said high pressure sub assembly being mechanically coupled via a gearbox to an alternator,
   wherein a coupling element for coupling with an external actuator is accessible on and provided on a common shaft of said alternator and of said gearbox, and is usable as a coupling to enable driving of said high pressure sub assembly, and
   wherein a first end of said common shaft is provided with said coupling element.

7. A mechanical drive device according to claim 1, further comprising a gearwheel provided on said drive shaft of said gearbox, said gearwheel meshing with a stepdown mechanism disposed inside said gearbox.

8. A mechanical drive device according to claim 6, further comprising a gearwheel provided on said common shaft, said gearwheel meshing with a stepdown mechanism.

9. A mechanical drive device according to claim 6, wherein the first end of the common shaft projects outside a casing of said gearbox or outside a casing of said alternator.

\* \* \* \* \*